United States Patent [19]

Tuma

[11] Patent Number: 5,347,850
[45] Date of Patent: Sep. 20, 1994

[54] METHOD FOR DETECTING AND LOCALIZING LEAKS IN ABOVE GROUND STORAGE TANKS

[75] Inventor: John E. Tuma, Friendswood, Tex.

[73] Assignee: Tanknology Corporation International, Houston, Tex.

[21] Appl. No.: 925,372

[22] Filed: Aug. 4, 1992

[51] Int. Cl.$^5$ ............................................. G01M 3/04
[52] U.S. Cl. ................................ 73/49.2; 73/40.5 R
[58] Field of Search .......... 73/49.2 T, 864.74, 40.5 R, 73/49.1, 40.7, 40.5 P

[56] References Cited

U.S. PATENT DOCUMENTS

| 4,725,551 | 2/1988 | Thompson | 73/40.7 |
| 4,754,136 | 6/1988 | Blakely | 73/49.2 T |

Primary Examiner—Hezron E. Williams
Assistant Examiner—Helen C. Kwok
Attorney, Agent, or Firm—Vaden, Eickenroht, Thompson, Boulware & Feather

[57] ABSTRACT

A method and apparatus for detecting and localizing a leak from an above-ground liquid storage tank is disclosed. The invention utilizes a fiber optic chemical sensor to sense vapor from the liquid stored in the tank through a plurality of horizontal bores created at spaced intervals through the strata underneath the tank. Each of the plurality of horizontal bores is connected to a vacuum pump and manifold system which delivers the vapor or liquid present in the strata underneath the tank, resulting from diffusion or leakage in the tank, to the fiber optic chemical sensor. The horizontal bores are created with the use of a pilot which protects the bottom of the tank from punctures and ensures that the bores lie in close proximity to the bottom of the tank, enabling the detection of leaks in the tank as they develop. A seal and conduit assembly is utilized for localization of a leak within the vicinity of a horizontal bore by exposing the vapor or liquid present in an isolated longitudinal section of the bore to the fiber optic chemical sensor.

7 Claims, 3 Drawing Sheets

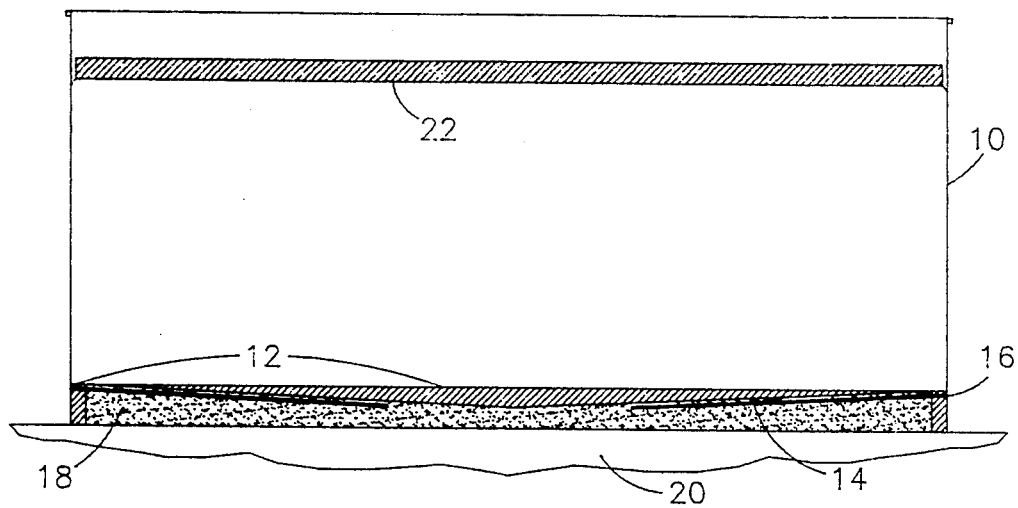
FIG. 1
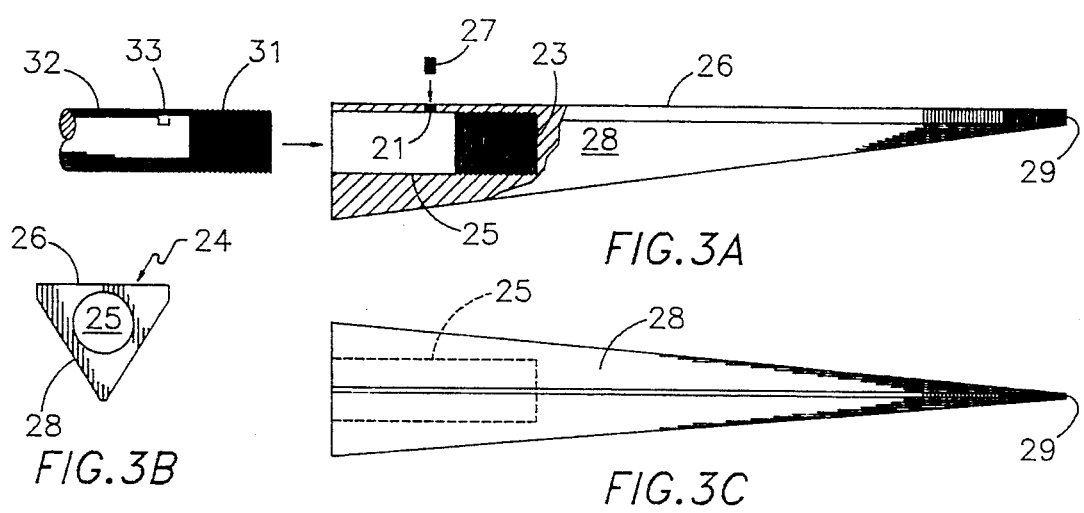
FIG. 3A
FIG. 3B
FIG. 3C

METHOD FOR DETECTING AND LOCALIZING LEAKS IN ABOVE GROUND STORAGE TANKS

BACKGROUND OF THE INVENTION

The present invention relates to the detection, localization, and quantification of leaks in a liquid storage vessel. More particularly, the present invention relates to a method and apparatus for detecting leaks in above ground liquid storage tanks by detecting the presence of vapor or liquid from the liquid stored in the tank in the strata underneath the tank.

Environmental awareness and concern for the economic loss from lost product has resulted in a relatively recent emphasis on insuring the tightness of liquid storage vessels. Of primary concern is the potential for contamination of underground water supplies caused by leaking gasoline or other refined petroleum products. In response to political pressures exerted by environmental and other interest groups, governmental authorities have imposed strict controls on the operation of such facilities to prevent contamination and to held arrest the deteriorating state of the environment.

Enforcement of these regulations has created a new and significant demand for testing procedures and equipment capable of detecting ever smaller amounts of leaking gasoline. For instance, current United States governmental regulations specify that the maximum allowable leakage from above ground storage tanks (ASTs) be no greater than 5 gallons per hour and it is expected that future standards will be even lower.

Most of the equipment and procedures currently known in the art for testing above ground storage tanks are not sufficiently accurate, and lack the greater resolution and precision required, to test against the lower standards. Improved methods such as that described in U.S. Pat. No. 4,462,249 have made it possible to test the underground storage tanks for leaks even smaller than 0.1 gal/hr, but so far as is known, no methods capable of such precision are available for testing above ground tanks for such leaks.

The difficulty with the testing of above ground tanks has been recognized for a long time. The diameter of such tanks is such that the drop in liquid level from a leak is barely perceptible because it is such a small portion of the total volume of the liquid tank in the tank. As noted in U.S. Pat. No. 3,062,994, in a tank having a diameter of two hundred feet, 10,000 gallons of liquid must be lost for the level to drop by 0.5 inches. Even if the capability existed to measure to measure such volumes accurately, a 0.05 inch decrease in the liquid level (and assuming a linear correlation between liquid level and volume), would evidence the loss of 1,000 gallons, which is a leak which would be considered a major environmental incident by current criteria. The size of these tanks also requires that the leak be located for repair. The tanks are often so large and expensive that replacement in the event of a leak is cost prohibitive such that repairs are required. Of course, finding the leak in the tank is a prerequisite to an effective repair.

The patent literature evidences many attempts to overcome the difficulty of detecting the location of a leak in an AST. For instance, U.S. Pat. No. 5,052,215 describes a method by which fluid is injected in the base beneath an above ground storage tank to enhance the rate of leakage from the bottom of the tank; leakage is then detected with acoustic sensors placed around the tank. Another approach is to use volatile liquid tracers as described in U.S. Pat. No. 5,048,324. The patent literature also includes grids or arrays of electronic probes (U.S. Pat. No. 4,646,069) for detecting the presence of the liquid that has leaked from the tank, ducts for conveying the gases from an escaped liquid past a sensor (U.S. Pat. No. 4,618,855), conductive wires which undergo a change in electrical properties when contacted by escaped liquid (U.S. Pat. No. 4,404,516), and reference and sensing electrodes for measuring changes in electric potential in the substrate/soil under the tank caused by escaped liquid (U.S. Pat. No. 4,166,244).

The above-mentioned, non-volumetric method described in U.S. Pat. No. 4,646,069, with the disclosure of an array of electronic probes, would provide at least some information as to the source of the leak. However, unless those probes are located close together, it may not be possible (because of the size of the tank) to localize the leak to a location any more precise than an area of several square feet on the bottom of the tank. There is the additional consideration as to the expense of using enough probes to increase the ability of such a system to localize the leak such that cost and resolution capability is always a trade-off. Further, ASTs are constructed on a bed of sand such that liquid and vapor originating at one point under the AST may be detected elsewhere. U.S. Pat. No. 4,896,528 describes a grid of test conduits under the tank and a description of isolating a portion of the conduits to better localize the leak, but the description is less than explicit and the cost and complication of the many conduits are disadvantageous. It is, therefore, a principal object of the present invention to provide an improved method for localizing a leak in an above ground storage tank. Other objects, and the advantages, of the present invention will be made clear to those skilled in the art by the following description of a presently preferred embodiment thereof.

SUMMARY OF THE INVENTION

The present invention applies fiber optic chemical sensor (FOCS) technology to detect and localize leaks from liquid storage tanks through a plurality of horizontal bores created at spaced intervals in the sand or other fill material underneath the tank. Creation of these bores necessitates boring holes in the concrete ring wall supporting the tank as well. The horizontal bores through the sand are created by forcing a pilot, which protects the bottom of the tank from punctures while ensuring that the bores remain in close proximity to the tank bottom, mounted on the end of a pipe into the sand through the holes in the ring wall.

Suction is applied to all of the bores simultaneously through a vacuum pump and manifold system for a period of time sufficient to release and withdraw the vapor which has previously diffused through the floor of the tank and become entrapped in the strata through which the bores lie. Alternatively, pressure is applied to another bore on the opposite side of the tank to flush the vapor or liquid out from under the tank. If no leaks are present, the detected concentration of hydrocarbons (specific to the liquid stored in the tank) found in the vapor removed from the bores will continue to decrease until reaching the level of these hydrocarbons found to exist in the above-ground atmosphere in close proximity to the tank wall. If the detected hydrocarbon concentration stabilizes at some point above this local diffusion level, which may be referred to as "background noise", then a leak exists in the bottom of the tank.

The fiber optic chemical sensor measures the amount of light returned from an optical fiber coated with a compound known to be sensitive to the liquid in the tank that is either positioned in the manifold or in the bore under the tank. The compound attracts and holds the hydrocarbon vapor or liquid, thereby increasing the amount of light escaping from the fiber due to the hydrocarbon's greater index of refraction. The fiber optic sensor is placed in the vacuum line and the end is coated with a fluorescing compound. Any loss in the quantity of light transmitted from the fluorescing compound is directly proportional to the quantity of the hydrocarbons in the bore(s) under the tank.

Once the presence of a leak is determined, it is localized by applying a vacuum to each of the horizontal bores independently. The FOCS is again used to detect hydrocarbons in the proximity of the bore indicating a local perforation in the bottom of the tank.

A leak may be further localized by selectively isolating longitudinal sections of the bore identified as lying in proximity to the leak. This localization is accomplished with a conduit and seal assembly comprising two cylindrical expandable elements which form a seal against the inner diameter of the bore. The expandable elements seal against the ends of a perforated conduit which restricts axial movement of the expandable elements. The vapor or liquid which has leaked from the tank is pulled by the vacuum into the perforated conduit, through a coupling mounting the conduit and seal assembly onto a pipe which is used to position the assembly in the bore, and through the pipe to the outside of the horizontal bore. Movement of the vapor may also be enhanced by air into the pipes. The FOCS enables the detection of hydrocarbons and thereby localizes the leak to the immediate vicinity of a selected longitudinal section of the bore.

BRIEF DESCRIPTION OF THE DRAWINGS

FIG. 1 is a cross-sectional view of an above-ground liquid storage tank.

FIG. 3A is a side elevational view of a pilot constructed in accordance with the teachings of the present invention which is used to create a substantially horizontal bore under an above-ground liquid storage tank.

FIG. 3B is an end view of the pilot of FIG. 3A.

FIG. 3C is a bottom plan view of the pilot of FIG. 3A.

DETAILED DESCRIPTION OF THE PREFERRED EMBODIMENT

Referring to FIG. 1, there is shown a cross-section of a typical above-ground liquid storage tank 10. Liquid storage tank 10 is constructed on a base comprised of a concrete ring wall 12 and a bed 18. The diameter of concrete ring wall 12 corresponds to that of the walls of tank 10 such that the entire circumference of the tank is supported by concrete. The bed 18 inside concrete ring wall 12 is filled with washed, crushed rock of a known size or sand which provides support and minimizes corrosive reactions at the bottom of tank 10. Concrete ring wall 12 rests on or within a supporting layer of backfill 20. The crushed rock or sand comprising bed 18 is porous and vapor conductive, thus allowing leaks from liquid storage tank 10 to permeate the bed 18 and invade the underlaying backfill 20. Those skilled in the art who have the benefit of this disclosure will recognize that the system and method of the present invention has utility with virtually any type of tank installation, whether the tank is supported by a concrete ring wall, concrete slab, sand bed, earth backfill, or any other means.

Figure 2:
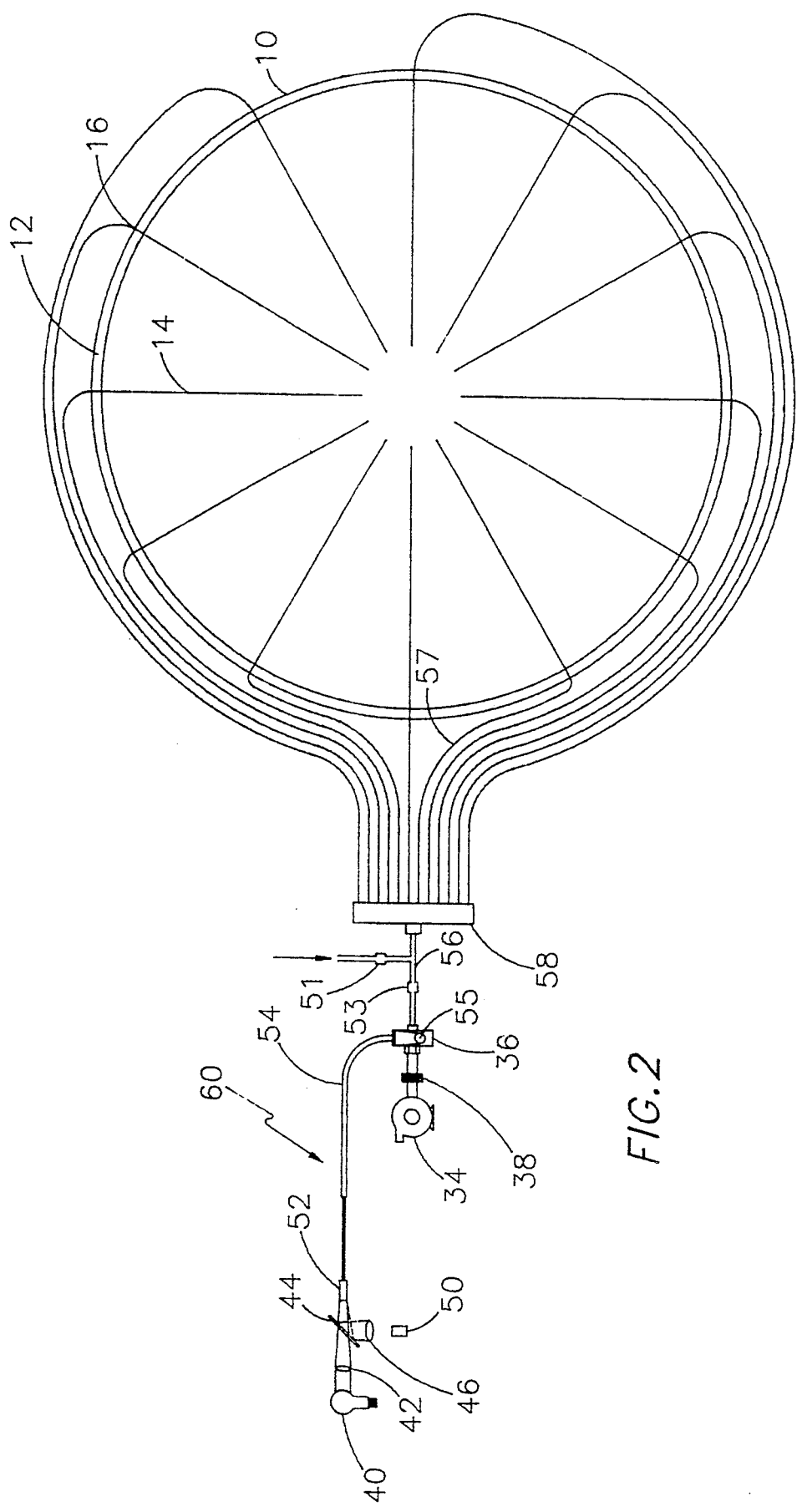
FIG. 2 is a schematic drawing of a plurality of spaced, substantially horizontal bores located in the strata under an above-ground liquid storage tank and having a fiber optic chemical sensor system connected thereto in accordance with the teachings of the present invention to detect the presence of vapor or liquid resulting from a leak in the tank.

As shown in FIGS. 1 and 2, the bed 18 of tank 10 is provided with a plurality of spaced substantially horizontal bores 14. It will be recognized by those skilled in the art that the circumferential spacing of the horizontal bores 14 depicted in FIG. 2 is but one of numerous divisions of the bed 18 which may be utilized for the localization of leaks from the tank. Horizontal bores 14 provide a convenient pathway for vapor or liquid which has leaked from tank 10 to accumulate.

A pilot, indicated generally at reference numeral 24 in FIGS. 3A, 3B, and 3C, is utilized to create the horizontal bores 14 under liquid storage tank 10. Pilot 24 is mounted on the end of a piece of pipe or other conduit 32 to function as a guiding tool for the mechanism employed to create the horizontal bores 14 through concrete ring 12 and sand bed 18.

As shown in FIG. 3B, pilot 24 is generally triangular in cross-section with a substantially flat upper surface 26 and a downwardly extending keel 28 along the length thereof, both upper surface 26 and keel 28 tapering to a point 29. The end of pilot 24 opposite point 29 is provided with a longitudinal bore 25 formed therein for receiving the end of a pipe 32. Threads 23 are formed at the end of bore 25 closest to point 29 for receiving a matching set of threads 31 on pipe 32 for retaining the pilot 24 on pipe 32. In a particularly preferred embodiment, pilot 24 is provided with means for preventing rotation of pilot 24 on the end of pipe 32 as pipe 32 is advanced into the bed 18 under tank 10. This rotation prevention means, in one embodiment, takes the form of a threaded pin 27 which is introduced into the threaded bore 21 which opens from the top surface 26 of pilot 24 into the bore 25 running longitudinally through pilot 24. When introduced into bore 21, pipe 32 is rotated until the hole 33 in the end of pipe 32 is aligned with pin 27, at which point pin 27 drops down into hole 33, allowing the threads on pin 27 to engage the threads of bore 21. Pin 27 is then tightened to prevent rotation of pilot 24 relative to pipe 32. In a second preferred embodiment, the rotation prevention means takes the form of a jam nut (not shown) which is threaded onto the threads 31 on the end of pipe 32 before the pilot 24 is spun onto those same threads 31. After pilot 24 is snugged onto the end of pipe 32, the jam nut is rotated back up the threads 31 into engagement with the end of pilot 24 opposite point 29, thereby preventing relative rotation of pilot 24.

The process of creating a horizontal bore 14 first entails boring a hole 16 in concrete ring wall 12. Those skilled in the art will recognize that numerous concrete "hole-saw" drilling attachments are commercially available for this purpose. An axial force is then applied to the end of pipe assembly 32 which is not connected to pilot 24, thus driving the pipe 32 having pilot 24 mounted thereto into bed 18 to the desired bore length. The elongate wedge shape of pilot 24 (when viewed in elevational, side view as shown in FIG. 3A) causes the pipe 32 to tend upwardly as the pipe 32 is forced into the bed 18, the keel 28 tending to resist lateral (e.g., side-to-side) movement as the pilot is advanced into the sand comprising bed 18, helping to insure that the bore maintains its intended path. It is, of course, highly desirable to avoid damage to the bottom of tank 10 while the pipe 32 is being forced into bed 18, and even though pilot 24 causes the pipe 32 to tend upwardly as the pipe is being advanced, the flat upper surface 26 causes the pilot 24 to plane along the underside of the bottom of the tank, thereby decreasing the likelihood of any such damage.

Those skilled in the art will realize that, in the presence of a leak, an appreciable quantity of vapor and/or liquid from the liquid stored in tank 10 will be present in the sand bed 18 in the immediate vicinity of the perforation in tank 10 causing the leak. The permeable nature of bed 18 allows the vapor and/or liquid to diffuse throughout the bed forming a "pool" of vapor and/or liquid underneath tank 10. It is therefore necessary to deplete the pool of vapor and/or liquid present in bed 18 resulting from diffusion through the bed to accurately identify the precise region of bed 18 in which the leak in tank 10 lies. The plurality of horizontal bores 14 created under tank 10 are manifolded together with manifold lines 57 for initial qualitative assessment of the presence of leaks in tank 10, as schematically illustrated in FIG. 2. Manifolding the bores in this manner facilitates simultaneous removal of vapor and/or liquid, which have escaped from tank 10 through a perforation in the tank floor, currently entrapped in bed 18 in the vicinity of each of the horizontal bores 14 under tank 10. In a presently preferred embodiment, a vacuum pump 34, equipped with liquid sensor 38, is used to create a suction at the manifold 58 thereby inducing simultaneous removal of the diffused vapor and/or liquid entrapped in the sand layer 18 in the vicinity of the horizontal bores 14 through manifold lines 57. The vapor is pulled through manifold 58 into vacuum line 56 where it contacts optical fiber 54 at vacuum line interface 36.

In a particularly preferred embodiment, a vacuum pressure gauge (not shown) is used to monitor the pressure in manifold 58. In the event the pressure in manifold 58 continues to decrease, indicating a lack of air flow into and through the pipe 32 in the bores under tank 10, the valve 53 in line 56 is closed, valve 51 is opened, and nitrogen from a cylinder of compressed gas expands into the manifold bores to open the perforations in the pipes 32 by forcing any sand closing those perforations back from the pipe 32.

As described in more detail in S. M. Klainer, et al., A Fiber Optic Chemical Sensor (FOCS) for Monitoring Gasoline, U.S. Environmental Protection Agency Environmental Monitoring Systems Laboratory Publication No. EPA/600/X-88/259 (Contract No. 68-03-3249) (1988), the FOCS, indicated generally at reference number 60, utilizes an optical fiber 54, the surface of which is coated with a material known to selectively attract the hydrocarbons present in the liquid in tank 10, as a sensor. The presence of hydrocarbons on the coating causes an increase in the index of refraction of the coating, thereby increasing the amount of light lost through optical fiber 54. Light is transferred to optical fiber receptacle 52 by means of light source 40 which passes through converging lens 42 and one-way mirror 44. The light passes through the optical fiber 54 and strikes the fiber end 55 which is coated with a fluorescing compound. The fluorescing compound on fiber end 55, once excited, produces light of a different color and wavelength than that of the source light. This fluoresced light travels back up optical fiber 54, exiting receptacle 52. This light then strikes one-way mirror 44 and is reflected out of the path of the source light into converging lens 46 and light sensor 50. Comparison of the measured amount of fluoresced light exiting optical fiber 54 with the known amount of source light transmitted into the fiber indicates the quantity of hydrocarbon vapor in contact with the surface of the fiber. The FOCS system 60 is sensitive to as little as one part per million of selected hydrocarbons.

When vacuum pump 34 is activated, FOCS 60 initially detects the hydrocarbons present in the sand of bed 18 resulting from diffusion through the bed of the vapor and/or liquid which has leaked from tank 10. After a sufficient period of time, this vapor and/or liquid entrapped in bed 18 is sufficiently evacuated to detect a drop in the level of hydrocarbons detected by optical fiber 54 in vacuum line interface 36. A separate sensor (not shown) placed in the atmosphere in the vicinity of tank 10 will give an indication of the level of "background noise" due to diffusion through the tank wall, which may be assumed to be consistent with the hydrocarbon concentration present in the air conductive sand layer 18 resulting from diffusion through the tank floor. If the level of hydrocarbons (specific to the liquid stored in tank 10) detected with FOCS 60 from vapor removed from the bores 14 stabilizes at a point above the measured background noise, then a leak is present in the bottom of tank 10. Those skilled in the art having the benefit of this disclosure will recognize that FOCS 60 could alternatively be calibrated to a zero point at this level of hydrocarbon "background noise". In this embodiment of the invention, a positive stabilized hydrocarbon reading with FOCS 60 would indicate the presence of a leak in tank 10.

Once a leak in tank 10 is qualitatively detected, the next step is to identify the horizontal bore(s) 14 which lie(s) in the vicinity of the leak. Each of the plurality of horizontal bores 14 is independently isolated using manifold 58, and the qualitative procedure for detecting the presence of a leak is repeated for each bore. Vacuum pump 34 is activated to remove any vapor and/or liquid which has leaked from tank 10 in the vicinity of each individual horizontal bore 14. If the level of hydrocarbon detected with FOCS 60 stabilizes above the previously detected level of background noise, the bore 14 under vacuum likely lies in the proximity of a leak and will be subject to a further isolation procedure. In the event that increased precision in localizing the leak in advantageous, additional bore(s) are created by forcing an additional pipe and pilot assembly into the bed 18 and connecting each additional pipe to FOCS 60 in serial fashion.

Figure 4:
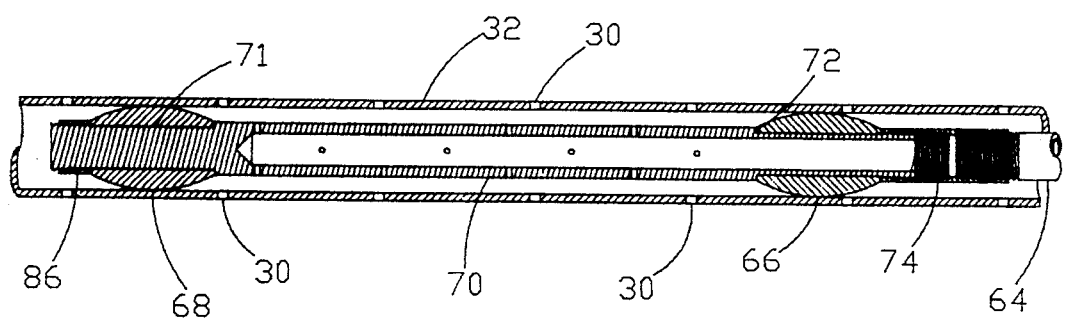
FIG. 4 is a sectional view of a conduit and seal assembly constructed in accordance with the teachings of the present invention which is used to isolate a longitudinal section of a horizontal bore under a liquid storage tank.

The final step for localizing the leak involves isolating longitudinal sections of the horizontal bore(s) 14 determined to lie in the vicinity of the leak. Referring to FIG. 4, threaded pipe 64 is used to selectively position a conduit and seal assembly (shown in FIG. 4) within the perforated pipe 32 forming horizontal bore 14. The conduit and seal assembly, connected to threaded pipe 64 by coupling 74, includes selectively radially expandable elements 66 and 68 on each end of a perforated conduit 70. In a presently preferred embodiment, elements 66 and 68 are made of a rubber or synthetic compound such as urethane and are fitted over a reduced diameter portion 71 at each end of conduit 70, the shoulders 72 prohibiting relative axial movement of respective elements 66 and 68. A coupling 74 is threaded at both ends, the threads at one end sized to engage threads on one end of perforated conduit 70 and the threads at the other end being sized to engage threads on the end of pipe 64. A jam nut 86 is threaded onto the blind end of conduit 70 so that, when pipe 64 is rotated the expandable element is compressed between the edge of coupling 74 and shoulder 72 and the expandable element 68 is compressed between the second shoulder 72 on conduit 70 and jam nut 86. Once the expandable elements 66 and 68 are expanded in this manner, the conduit and seal assembly is inserted into pipe 32 and selectively positioned in the pipe to seal a longitudinal section of bore 14 by forming a seal against the inner diameter of perforated pipe 32.

Once a longitudinal section of the horizontal bore 14, identified as lying in proximity to the leak, is isolated, vapor and/or liquid which has leaked from tank 10 is withdrawn from sand bed 18 by applying a vacuum to the outer end of pipe 64. Vacuum pump 34 again moves vapor from horizontal bore 14 into contact with optical fiber 54. If the level of hydrocarbons detected by FOCS 60 is at or below the previously measured level of background noise, then the leak does not exist in the immediate vicinity of the isolated section of bore 14. Continued selection of isolated longitudinal sections of bore 14 enables precise localization of (a) leak(s) in liquid storage tank 10.

Figure 5:
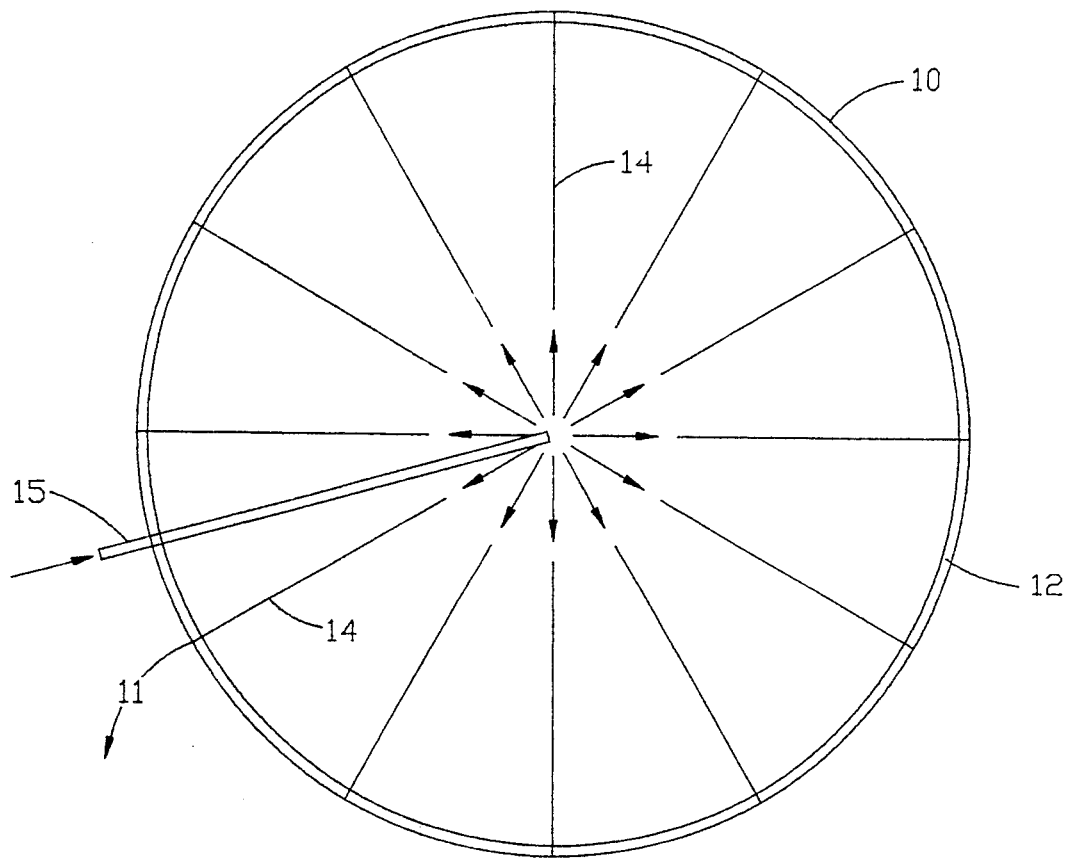
FIG. 5 is a schematic illustration of an alternative embodiment of the present invention.

It will therefore be appreciated by those skilled in the art that a new and useful system and method for detecting leaks from above-ground liquid storage tanks has been described and disclosed. While the present description is considered to be the preferred embodiment of the present invention, it will be apparent that various modifications may be made therein without departing from the true scope and spirit of the present invention, which the claims appended hereto are intended to cover. For example, an alternative embodiment of the present invention, shown schematically in FIG. 5, employs a horizontal bore 15 created in sand bed 18 with a pilot and pipe assembly extending to the region of bed 18 beneath the center of the floor of tank 10. Compressed inert gas, preferably nitrogen, is introduced to bed 18 through the outlet of horizontal bore 15. The compressed gas flows through the central region of bed 18 and "washes out" vapor and/or liquid leaked from tank 10 into bores 14, which provide pathways of least resistance in said bed 18. A further alternative embodiment employs open-ended conduits within the horizontal bores 14 extending substantially through the length of the bores. Compressed inert gas is introduced to the outlet of the bores 14 but is not introduced to the outlet of the conduits. The compressed gas flows through the length of bores 14 and upon reaching the end of the bore turns into the path of least resistance, that being the pathway provided by open end of the conduits inserted into bores 14. The hydraulic action of the compressed gas withdraws vapor and/or liquid, which has leaked from tank 10, from sand bed 18 into the conduits which communicate with FOCS 60.

Those skilled in the art will also recognize from this disclosure that the present invention is adaptable for use in continuously monitoring an AST for a leak. When used for continuous monitoring, a fiber optic sensor is placed in each of the horizontal bores 14 and the outputs from each sensor routed to an on-site computer set to sound an alarm or dial (for instance, through a modem) a central computer to alert the tank operator when the output from the sensors exceeds some predetermined level. Note that no vacuum need by applied to the bores when used in this manner. All such modifications are intended to fall within the scope of the following claims.

What is claimed is:

1. A method for isolating a longitudinal section of a horizontal bore through the stata under a liquid storage tank for detecting vapor or liquid that is entrapped in the strata after escaping through a leak in the bottom of the storage tank and for localizing the leak along the horizontal bore comprising the steps of:
   (a) positioning a perforated conduit having means positioned on the outside diameter of the conduit at both ends thereof to form a conduit and seal assembly for selectively sealing against the inside diameter of the horizontal bore and the outside diameter of the conduit in the horizontal bore with an elongate member which extends outside the bore and to which the conduit and seal assembly is connected and having a passageway therethrough communicating with the inside of the conduit, the conduit being closed at the end first inserted into the bore;
   (b) activating the sealing means to isolate the longitudinal section of the bore between the sealing means and surrounding the conduit;
   (c) evacuating the isolated longitudinal section of the bore through the passageway in the elongate member to remove any vapor or liquid that is entrapped in the strata surrounding the isolated longitudinal section of the bore;
   (d) measuring any vapor or liquid in the gases evacuated from the strata surrounding the isolated section of the bore with a sensor sensitive to the level of the vapor or liquid that has escaped from the tank that is positioned in the flow of evacuated gases; and
   (e) continuing the evacuation of the gases from the strata surrounding the isolated longitudinal section of the bore until the level of any vapor or liquid being measured by the sensor either levels off at a level above background levels, indicating the presence of a leak in the bottom of the tank in the vicinity of the isolated longitudinal section of the bore, or decreases to background level, indicating the absence of a leak in the vicinity of the isolated longitudinal section of the bore.

2. The method of claim 1 in which the sealing means comprises first and second radially expandable elements.

3. The method of claim 1 in which the elongate member is steel pipe.

4. The method of claim 2 wherein the radially expandable elements are expanded by rotating the elongate member.

5. The method of claim 1 additionally comprising monitoring the pressure of the evacuated gases.

6. The method of claim 1 additionally comprising sensing the level of liquid or vapor outside of the bore.

7. The method of claim 1 additionally comprising connecting the sensor to a plurality of bores in serial fashion to locate any leaks which may be present under the tank.

* * * * *